(12) United States Patent
Atherton et al.

(10) Patent No.: US 7,496,708 B2
(45) Date of Patent: Feb. 24, 2009

(54) BOOT READ-ONLY MEMORY (ROM) CONFIGURATION OPTIMIZATION

(75) Inventors: William E. Atherton, Hillsborough, NC (US); Richard A. Dayan, Wake Forest, NC (US); Scott N. Dunham, Raleigh, NC (US); William B. Schwartz, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 179 days.

(21) Appl. No.: 11/458,477

(22) Filed: Jul. 19, 2006

(65) Prior Publication Data
US 2008/0022033 A1 Jan. 24, 2008

(51) Int. Cl.
*G06F 12/00* (2006.01)
(52) U.S. Cl. .................................. 711/102
(58) Field of Classification Search ............ None
See application file for complete search history.

(56) References Cited

U.S. PATENT DOCUMENTS 7,284,084 B2 * 10/2007 Atherton et al. ............ 711/102
2003/0159025 A1 8/2003 Dubal

* cited by examiner

*Primary Examiner*—Hiep T Nguyen
(74) *Attorney, Agent, or Firm*—Cynthia S. Byrd, Esq.; Steven M. Greenberg, Esq.; Cary Rodriguez Greenberg & Paul LLP

(57) ABSTRACT

Embodiments of the invention address deficiencies of the art in respect to boot ROM handling and provide a method, system and computer program product for optimized boot ROM handling for I/O devices. In one embodiment of the invention, a ROM scan area optimization method can be provided. The method can include pre-processing multiple boot ROM images to determine memory space requirements in the ROM scan area for all of the boot ROM images. The method further can include partitioning the ROM scan area into multiple, different static portions and at least one dynamic paged portion. Finally, the method can include generating an optimal arrangement of the boot ROM images defining placement of some of the boot ROM images in corresponding ones of the static portions, and others of the boot ROM images in the dynamic paged portion.

14 Claims, 3 Drawing Sheets

BOOT READ-ONLY MEMORY (ROM) CONFIGURATION OPTIMIZATION

BACKGROUND OF THE INVENTION

1. Field of the Invention

The present invention relates to the field of boot read-only memory (ROM) handling and more particularly to the field of boot ROM memory sharing amongst multiple, different input/output (I/O) adapters.

2. Description of the Related Art

Boot ROM refers to the firmware embedded in a computing device that enables the computing device to bootstrap to an operational state. Generally, a boot ROM includes enough logic embedded in the firmware to enable the computing device to retrieve further logic from fixed storage and to execute retrieved logic in memory in order to ultimately arrive at an operational state. While boot ROMs have formed part and parcel of personal computing devices for decades, boot ROMs also have been integral in the networked enterprise in enabling a uniform configuration of different, communicatively coupled I/O devices in a network.

In the network configuration, a boot ROM brings a host I/O device to an initial operational state. Subsequently, the boot ROM can solicit and retrieve subsequent boot instructions from a server device over a computer communications network. In this way, as modifications are performed in the boot instructions, the modifications can be performed centrally thereby obviating the need for updating the boot ROM in each I/O device.

Generally, the logic of the boot ROM can be loaded into a memory address space in random access memory (RAM) prior to execution. In many circumstances, however, such as in the case of the 0×86 processor, the memory address space can be limited to one-hundred and twenty-eight (128) kilobytes (KB) by way of example. Yet, on occasion, it is possible that the memory address space for accommodating the logic of the boot ROM can become overcommitted and can fall short in size of the required space. Consequently, the memory address space in RAM can be "paged", as it is well-known in the art, in order to swap in and out the required logic when executing the boot ROM.

Memory paging can be computationally expensive and can slow the execution of boot ROM logic. In conventional boot ROM paging algorithms, however, portions of a boot ROM can be paged indiscriminately. Other conventional boot ROM paging algorithms provide for memory paging for multiple different boot ROM images from different I/O adapters in a computer communications network. In the latter circumstance, however, the paging as before can be performed indiscriminately without regard to the optimization of access to selected ones of boot ROM images for different I/O adapters.

BRIEF SUMMARY OF THE INVENTION

Embodiments of the invention address deficiencies of the art in respect to boot ROM handling and provide a novel and non-obvious method, system and computer program product for optimized boot ROM handling for I/O devices. In one embodiment of the invention, a ROM scan area optimization method can be provided. The method can include pre-processing multiple boot ROM images to determine memory space requirements in the ROM scan area for all of the boot ROM images. The method further can include partitioning the ROM scan area into multiple, different static portions and at least one dynamic paged portion. Finally, the method can include generating an optimal arrangement of the boot ROM images defining placement of some of the boot ROM images in corresponding ones of the static portions, and others of the boot ROM images in the dynamic paged portion.

In one aspect of the embodiment, the method further can include performing the partitioning and the generating steps only if the memory space requirements exceed a memory space size of the ROM scan area. In another aspect of the embodiment, the method further can include run time monitoring access to the boot ROM images in the ROM scan area, and recording empirical data relating to the access to the boot ROM images. As such, the most frequently and less frequently accessed ones of the boot ROM images can be identified from the empirical data. Consequently, generating an optimal arrangement of the boot ROM images can include defining placement of the most frequently accessed boot ROM images in corresponding ones of the static portions, and the less frequently access of the boot ROM images in the dynamic paged portion.

In another embodiment of the invention, a boot ROM handling data processing system can be provided. The system can include a processor board coupled to a bus configured to receive a plurality of I/O devices, where each of the I/O devices includes a boot ROM. The system also can include a central processing unit (CPU) and a memory each disposed in the processor board. A ROM scan area can be defined within the memory and power on self test (POST) logic can be coupled to the CPU and the memory. Notably, a run time monitor can be provided that can include program code enabled to persist empirical data for accessing a plurality of boot ROM images in the ROM scan area. Finally, a boot ROM pre-processor can be provide that can include program code enabled to measure required memory in the ROM scan area, to determine an amount of memory in the ROM scan area necessary to accommodate the boot ROM images, and to activate the run time monitor when the boot ROM images require more memory than can be provided by the ROM scan area.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide a method, system and computer program product for performance enhanced boot ROM handling. In accordance with an embodiment of the present invention, an optimal arrangement of boot ROM images for corresponding I/O devices can be determined for a ROM scan area such that some of the boot ROM images can be stored within a static address space in the ROM scan area and others can be paged dynamically in a paged address space in the ROM scan area. The optimal arrangement can be determined through a pre-processing of the boot ROM images and subsequent run time monitoring of the boot ROM images in the ROM scan area.

In one aspect of the invention, the optimal arrangement can distinguish those boot ROM images which are most frequently accessed from those boot ROM images which are least frequently accessed. In this regard, the most frequently accessed boot ROM images can be placed in a static portion of the address space in the ROM scan area. In contrast, the least recently accessed boot ROM images can be paged in and out of a paged portion of the address space in the ROM scan area. In this way, the most frequently accessed boot ROM images will not suffer from any latencies arising from paging, while still accommodating a collective set of boot ROM images whose memory requirements exceed that of the boot ROM scan area.

Figure 1:
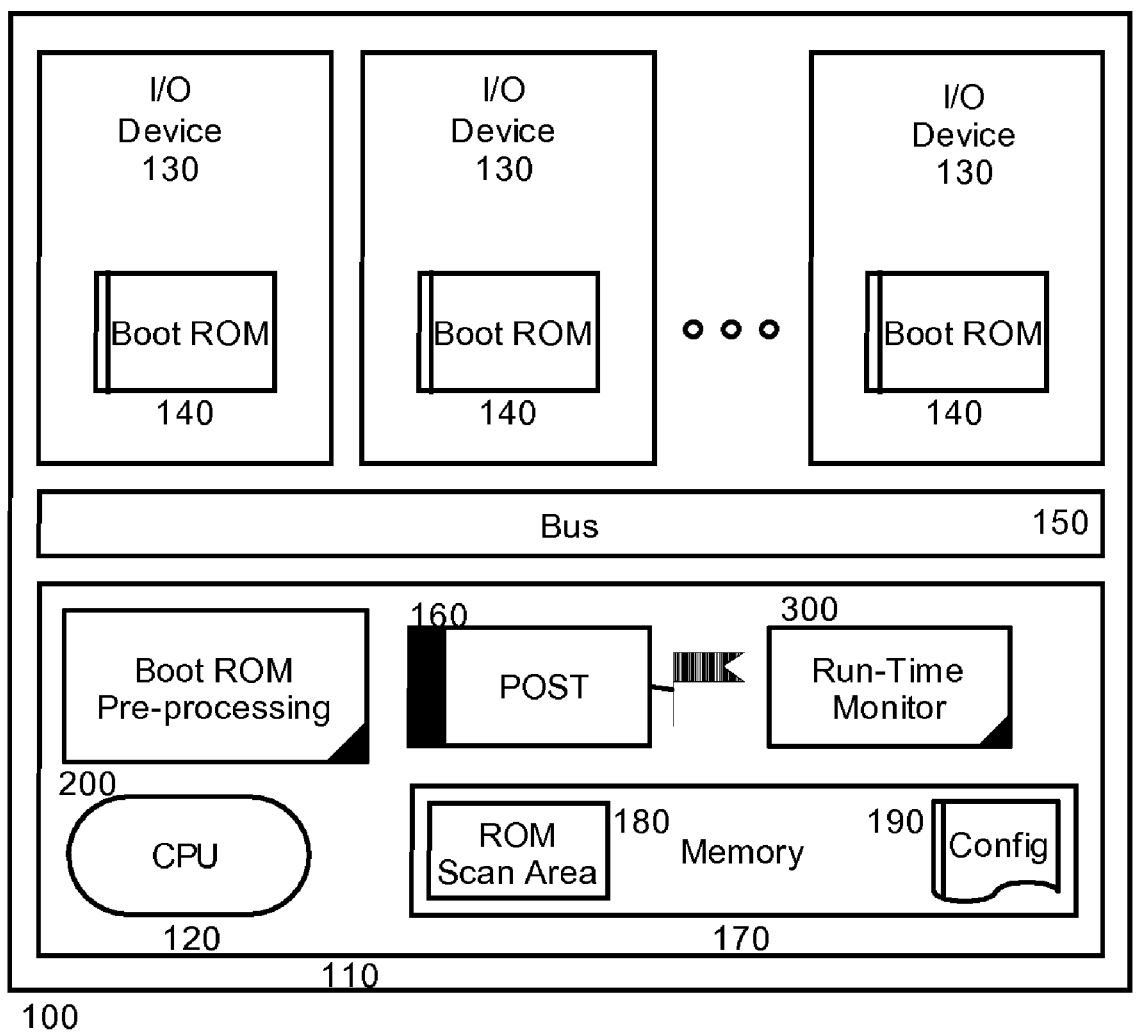
FIG. 1 is a schematic illustration of a data processing system configured for performance enhanced boot ROM handling.

In illustration of one embodiment of the invention, FIG. 1 depicts a data processing system configured for performance enhanced boot ROM handling. The data processing system can include a computing environment 100 of one or more I/O devices 130 communicatively coupled to a processor board 110 through bus or backplane 150. The processor board 110 can include a central processing unit 120, power on self test (POST) logic 160, and general purpose memory 170. The general purpose memory 170 can include an allocation of address space for a ROM scan area 180 into which one or more images of boot ROMs 140 for the I/O devices 130 can be stored for use.

Both boot ROM pre-processing logic 200 and a run-time monitor 300 can be provided in the computing environment 100. The boot ROM pre-processing logic 200 can include program code enabled to determine when the memory requirements for images of the boot ROMs 140 exceeds the size of the ROM scan area 180. If so, the program code of the boot ROM pre-processing logic 200 further can be enabled to initiate a run time monitoring process in the run time monitor 300. The run time monitoring process of the run time monitor 300 can collect metrics for images of the boot ROMs 140 in the ROM scan area 180 in order to identify the most frequently accessed images of the boot ROMs 140. Thereafter, an optimal configuration 190 can be devised for placing some images of the boot ROMs 140 in static portions of the ROM scan area 180 while paging other images of the boot ROMs 140 dynamically.

Figure 2:
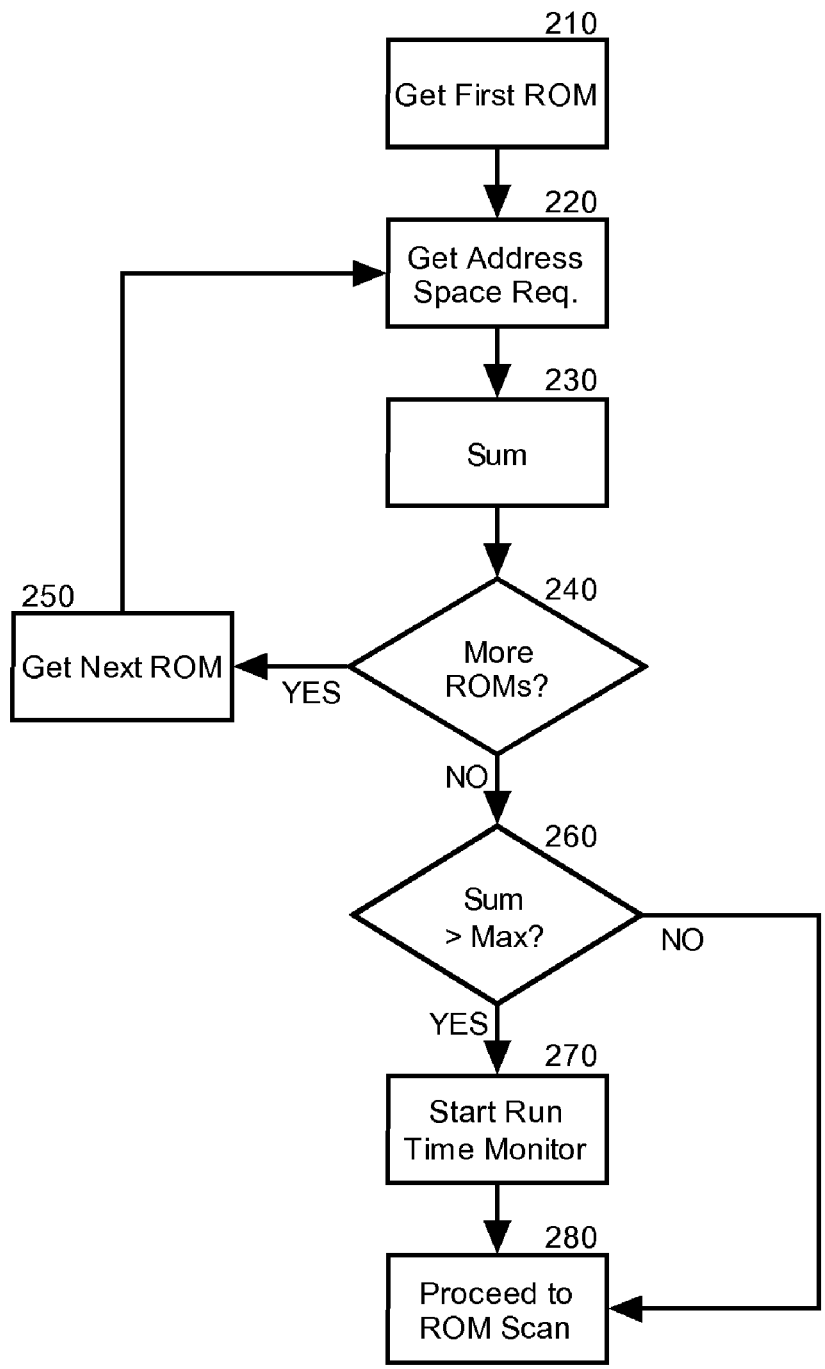
FIG. 2 is a flow chart illustrating a process for pre-processing boot ROM images for performance enhanced boot ROM handling; and, FIG. 3 is a flow chart illustrating a process for performance enhanced boot ROM handling.

In further illustration, FIG. 2 is a flow chart illustrating a process for pre-processing boot ROM images for performance enhanced boot ROM handling. Beginning in block 210, a first boot ROM can be selected for processing and in block 220, the memory space requirements for an image of the selected boot ROM can be determined. In block 230, the memory space requirements can be added to a sum total for all boot ROM images. Thereafter, the process can repeat in decision block 240 and in block 250 for additional boot ROM.

When no further boot ROM images remain to be processed, decision block 260 it can be determined whether the sum total exceeds a maximum size of the boot ROM scan area in memory. If so, in block 270, the run time monitor can be flagged for execution in order to initiate the process of achieving an optimal arrangement of boot ROM images in the ROM scan area of memory. Thereafter, in block 280, the loading of the boot ROM images into the ROM scan area of memory can commence. Notably, once activated the run time monitor can observe the loading and use of boot ROM images in the ROM scan area in order to identify the most frequently accessed images. In this way, empirical data reflecting the use of the boot ROM images can be used subsequently to determine an optimal arrangement of boot ROM images in the ROM scan area.

Figure 3:
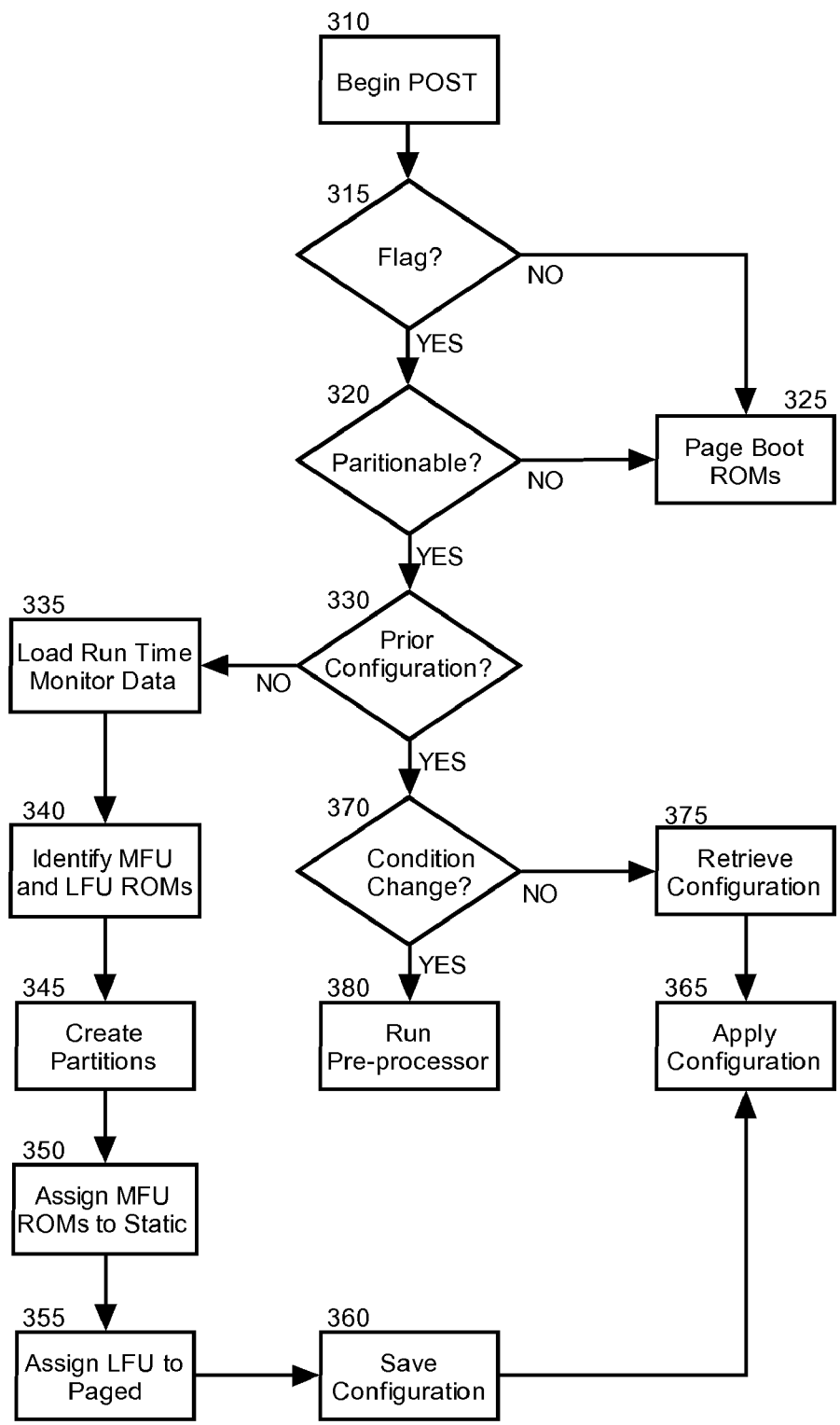

Turning now to FIG. 3, the POST process can initiate during bootstrap in block 310 and in decision block 315, it can be determined whether the run time monitor has been flagged for execution. If not, in block 325 the boot ROM images can be loaded into the ROM scan area in a non-optimal, conventional manner. Otherwise, in decision block 320, it can be determined if the ROM scan area is partitionable. Again, if not the boot ROM images can be loaded into the ROM scan area in a non-optimal, conventional manner. Otherwise, the process can continue in decision block 300.

In decision block 330, it can be determined if a prior, optimal configuration for the boot ROM images has been stored for use. If not, an optimal configuration can be determined beginning in block 335 and continuing through block 355. Specifically, in block 335, the observed empirical data can be loaded for analysis and in block 340, the most frequently accessed boot ROM images can be noted, as can the least frequently accessed boot ROM images. In block 345, the ROM scan area can be partitioned into one or more static partitions of enough size as to accommodate all or a portion of the most frequently used boot ROM images. At least one remaining partition can be configured as paged space for the least frequently accessed boot ROM images.

In block 350, the most frequently access boot ROM images each can be assigned to a corresponding static partition in the ROM scan area, while in block 355 the least frequently accessed boot ROM images can be assigned to the paged portion of the ROM scan area. Thereafter, in block 360 the configuration can be saved for subsequent use. Finally, in block 365 the configuration can be applied to the ROM scan area as an optimal arrangement of boot ROM images.

Of note, during subsequent bootstrapping sequences, in decision block 330 the optimal arrangement of boot ROM images saved in a configuration can be detected and, in decision block 370, so long as the condition of the images has not changed, in block 375 the configuration can be retrieved and applied in block 365. Of course, to the extent the condition of the boot ROM images has changed, such as in the case where a new I/O device has been added, or an existing device has been removed, or where a boot ROM has changed within an existing device, in block 380 it will be necessary to re-run pre-processing to establish a new optimal arrangement of boot ROM images in the ROM scan area.

The embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. I/O adapters may also be coupled to the system to enable the data processing system to become coupled to other data processing systems or remote printers or storage devices through intervening private or public networks. Modems, cable modem and Ethernet cards are just a few of the currently available types of I/O adapters.

We claim:

1. A read only memory (ROM) scan area optimization method comprising:
   pre-processing a plurality of boot ROM images to determine memory space requirements in the ROM scan area for all of the boot ROM images;
   partitioning the ROM scan area into a plurality of static portions and at least one dynamic paged portion; and,
   generating an optimal arrangement of the boot ROM images defining placement of some of the boot ROM images in corresponding ones of the static portions, and others of the boot ROM images in the at least one dynamic paged portion.

2. The method of claim 1, further comprising performing the partitioning and the generating steps only if the memory space requirements exceed a memory space size of the ROM scan area.

3. The method of claim 1, further comprising:
   run time monitoring access to the boot ROM images in the ROM scan area; and,
   recording empirical data relating to the access to the boot ROM images.

4. The method of claim 3, further comprising identifying most frequently and less frequently accessed ones of the boot ROM images from the empirical data.

5. The method of claim 4, wherein generating an optimal arrangement of the boot ROM images comprises defining placement of the most frequently accessed boot ROM images in corresponding ones of the static portions, and the less frequently access of the boot ROM images in the at least one dynamic paged portion.

6. The method of claim 1, further comprising, repeating the step of generating an optimal arrangement of the boot ROM images whenever a condition change is detected in a previously established optimal arrangement of boot ROM images.

7. A boot read only memory (ROM) handling data processing system comprising:
   a processor board coupled to a bus configured to receive a plurality of input/output (I/O) devices, each of the I/O devices comprising a boot ROM;
   a central processing unit (CPU) and a memory each disposed in the processor board;
   a ROM scan area defined within the memory;
   power on self test (POST) logic coupled to the CPU and the memory;
   a run time monitor comprising program code enabled to persist empirical data for accessing a plurality of boot ROM images in the ROM scan area; and,
   a boot ROM pre-processor comprising program code enabled to measure required memory in the ROM scan area, to determine an amount of memory in the ROM scan area necessary to accommodate the boot ROM images, and to activate the run time monitor when the boot ROM images require more memory than can be provided by the ROM scan area.

8. The system of claim 7, wherein the POST logic comprises program code enabled to retrieve a configuration defining an optimal arrangement of boot ROM images in partitions in the ROM scan area and to apply the configuration to the ROM scan area.

9. A computer program product comprising a computer usable storage medium embodying computer usable program code for read only memory (ROM) scan area optimization, the computer program product comprising:
   computer usable program code for pre-processing a plurality of boot ROM images to determine memory space requirements in the ROM scan area for all of the boot ROM images;
   computer usable program code for partitioning the ROM scan area into a plurality of static portions and at least one dynamic paged portion; and,
   computer usable program code for generating an optimal arrangement of the boot ROM images defining placement of some of the boot ROM images in corresponding ones of the static portions, and others of the boot ROM images in the at least one dynamic paged portion.

10. The computer program product of claim 9, further comprising computer usable program code for performing the partitioning and the generating steps only if the memory space requirements exceed a memory space size of the ROM scan area.

11. The computer program product of claim 10, further comprising:
    computer usable program code for run time monitoring access to the boot ROM images in the ROM scan area; and,
    computer usable program code for recording empirical data relating to the access to the boot ROM images.

12. The computer program product of claim 11, further comprising computer usable program code for identifying most frequently and less frequently accessed ones of the boot ROM images from the empirical data.

13. The computer program product of claim 12, wherein the computer usable program code for generating an optimal arrangement of the boot ROM images comprises computer usable program code for defining placement of the most frequently accessed boot ROM images in corresponding ones of the static portions, and the less frequently access of the boot ROM images in the at least one dynamic paged portion.

14. The computer program product of claim 9, further comprising, computer usable program code for repeating the step of generating an optimal arrangement of the boot ROM images whenever a condition change is detected in a previously established optimal arrangement of boot ROM images.

* * * * *